United States Patent

[11] 3,613,060

| [72] | Inventor | Bernard Legrand<br>Manosque, France |
|---|---|---|
| [21] | Appl. No. | 865,347 |
| [22] | Filed | Oct. 10, 1969 |
| [45] | Patented | Oct. 12, 1971 |
| [73] | Assignee | Commissariat A L'Energie Atomique<br>Paris, France |
| [32] | Priority | Oct. 22, 1968 |
| [33] |  | France |
| [31] |  | 170821 |

[54] SYSTEM FOR REMOTE TRANSMISSION OF DATA AND COMPENSATION OF DRIFTS
4 Claims, 6 Drawing Figs.

[52] U.S. Cl.......................................................... 340/177,
340/203, 340/206, 340/347 NT, 340/183
[51] Int. Cl............................................................. G08c 19/22
[50] Field of Search.................................................. 340/177 R,
177 CA, 151, 203, 206, 183, 347 AD; 325/42, 53,
143

[56] References Cited
UNITED STATES PATENTS

| 2,753,547 | 7/1956 | Donath et al. | 340/177 |
| 2,857,526 | 10/1958 | Galton | 340/206 |
| 3,087,156 | 4/1963 | D'Onofrio et al. | 340/206 |
| 3,229,272 | 1/1966 | Cohen et al. | 340/206 |
| 3,316,547 | 4/1967 | Ammann | 340/347 AD |
| 3,366,881 | 1/1968 | Malone et al. | 340/206 |
| 3,390,354 | 6/1968 | Munch | 332/9 |
| 3,419,784 | 12/1968 | Winn | 321/8 |

*Primary Examiner*—John W. Caldwell
*Assistant Examiner*—Robert J. Mooney
*Attorney*—Cameron, Kerkam & Sutton ABSTRACT: The telemetering system comprises a fixed interrogator-receiver station and at least one moving transponder station. Each transponder haS a ramp generator for producing a linearly rising voltage and threshold discriminators for forming $2n$ pulses which define in pairs $n$ time intervals representing respectively a reference quantity and $n-1$ measured quantities. A direct current voltage linear integrator in the interrogator-receiver station comes into operation during said $n$ time intervals. At the end of the first time interval a voltage comparator measures the difference between the voltage corresponding to the reference quantity and a local standard reference voltage. During the other $n-1$ time intervals the integrator is controlled by the comparator for the correction of the integrations during said $n-1$ intervals.

SYSTEM FOR REMOTE TRANSMISSION OF DATA AND COMPENSATION OF DRIFTS

This invention is concerned with a system for remote metering between at least one fixed interrogator-receiver station and at least one moving transponder station.

One of the main applications of the invention is the arrangement of a telemetering system for the remote transmission of measured data from a plurality of moving transponder stations to a fixed interrogator-receiver station.

A number of conventional telemetering systems employ either voltage-frequency conversion in the technique of analog representation or analog-to-digital conversion in the technique of digital representation. In this case, either integrating systems or weight-comparison systems are employed.

When the conversion of a voltage to a proportional frequency is adapted, an oscillator controlled by a direct current voltage is employed. High precision cannot be obtained in the present state of the art by making use of conventional and inexpensive means. It is in fact a very difficult matter to obtain good linearity with a sufficient amplitude of oscillations. The disturbing effect of temperature on the oscillator is too great, with the result that the frequency of the direct current output voltage is liable to vary for a cause other than the direct current input voltage.

It is also possible to control an integrator by means of a voltage representing the signal to be transmitted. Said integrator is accordingly operative during a time interval which is proportional to said voltage. During said time interval, a count is taken of the pulses emitted by a clock pulse generator and the resulting number which is coded in a suitable manner represents the direct current voltage. Unfortunately, temperature variations produce action on the integrator and in particular on the value of the integration resistance and capacitance. It is known to construct circuits which produce a stable integration voltage as well as resistors having stable values within the limits of requisite precision but capacitors which have a temperature coefficient of less than 100 p.p.m./° C. are not available in commerce. Under these conditions, the analog-to-digital conversion which is carried out cannot be achieved with a satisfactory degree of accuracy.

In the case of weight-comparison systems, the direct current voltage which represents the measured quantity is compared with a reference voltage. If said direct current voltage is either higher or lower than said reference voltage and the difference between the two voltages is greater than the predetermined value, a second comparison with another reference voltage is carried out and this operation is repeated as many times as is made necessary by the desired degree of precision. The weight number which has served for the comparison produces after coding a signal which corresponds to the measurement. In this case also, the action of temperature tends to modify the reference voltage as well as the values of all the resistors which serve to obtain the different weights. An apparatus of this type which comprises an appreciable number of switching and comparison devices (thresholds) is very costly to produce if it is desired to achieve a good standard of accuracy.

It is an object of the invention to provide a system which is substantially free of the drawbacks which have been referred to above, adapted to include a fixed interrogator-receiver station and a plurality of transponder stations.

It is another object of the invention to provide a system which provides a high degree of precision, it is not influenced by variations of temperature, and requires a transmission time which is of the same order as that which is obtained when digital transmissions are employed.

An equipment unit of this type makes it possible to transmit a number of simultaneous measurements, subject to local or government regulations. It will also be noted by way of conclusion that the capital cost of the transmitting station is very low, that a high degree of reliability is achieved in the transmission of information and that the system has a wide dynamic range.

The objects and advantages of the invention will be better understood from the following description of a system in accordance with the invention, given by way of nonlimitive example.

The description refers to the accompanying drawings wherein.

Figure 1A:
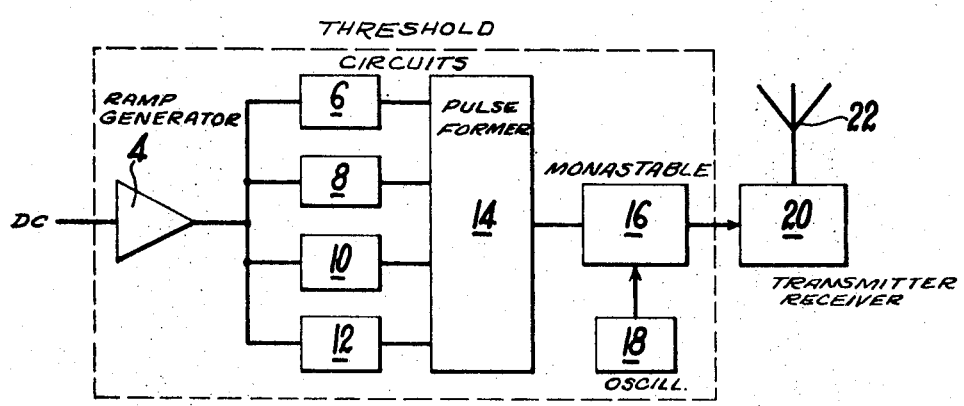
FIG. 1a is a circuit diagram of the low-frequency stages of a moving transponder station.
Figure 2A:
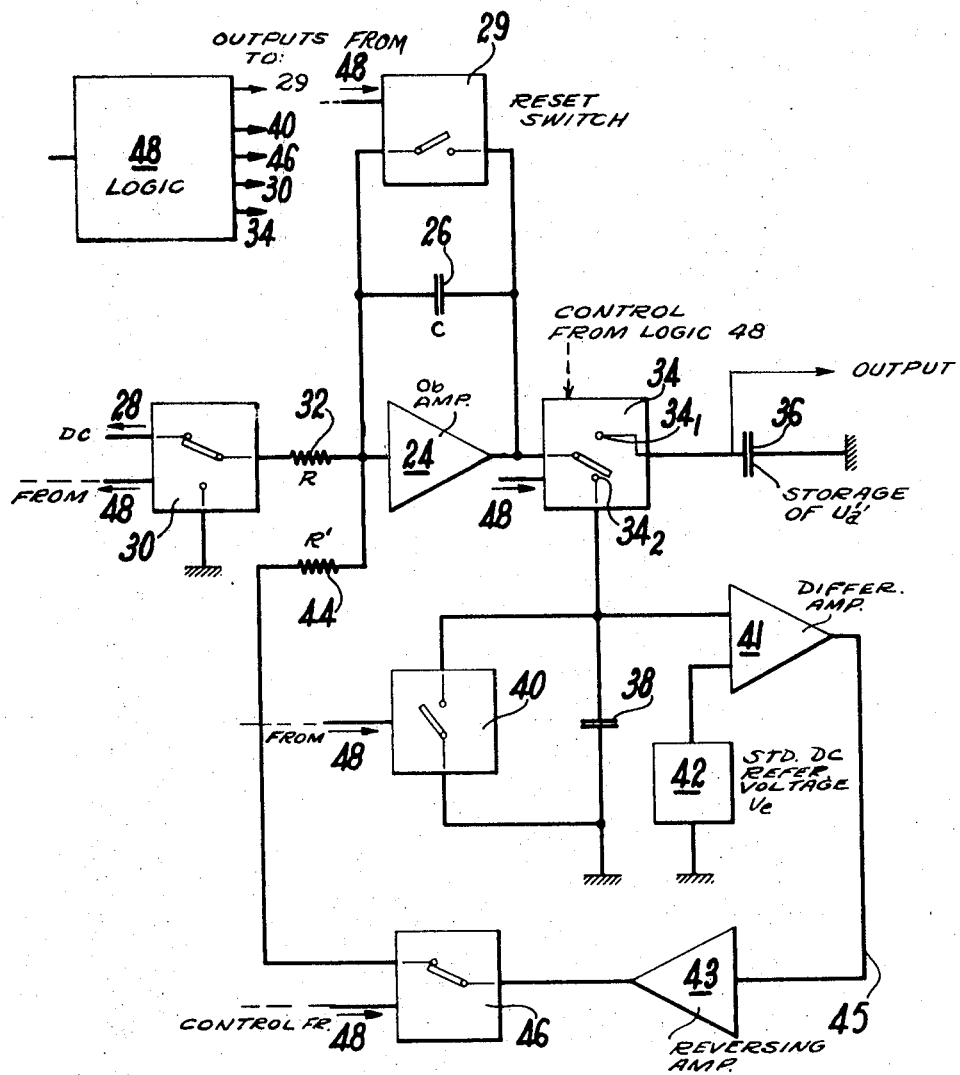
FIG. 2a is a circuit diagram of the integrating and correcting stage of a fixed interrogator-receiver station.

The problem to be solved consists in transmitting by telemetry a voltage whose value is a measurement of a phenomenon to be observed and which is produced at a first location designated A; said voltage should be transmitted to a stationary location B at which the recording instruments are centralized. To this end, a transponder station is located at A as shown in FIG. 1a and an interrogator-receiver station is placed at B as shown in FIG. 2a; the first station produces signals which are transmitted to the second station upon interrogation by this latter.

At the transponder station which is located at A, the measured quantity representing the phenomenon under observation is transformed into an electric voltage $Ua$ to be transmitted, said voltage being then converted into a time interval by means of ramp generator; said voltage produces two pulses separated by the necessary time interval in order that the voltage produced by the generator should vary by the value $Ua$, given that $Va = U_{S4} - U_{S3}$ wherein $U_{S4}$ and $U_{S3}$ are the values of the voltage produced by the generator when pulses are emitted.

If $t = t_4 - t_3$ is the duration of the time interval which is necessary to ensure that the voltage produced by the integrating device should vary by $U_a$, we may write:

$$t = t_4 - t_3 = k_o U_a = k_o(U_{S4} - U_{S3}),$$

wherein $k_o$ is the normal value of a proportionality factor $k$ of the generator.

As a function of time and also of temperature, the proportionality factor can vary over a wide range and the measurements taken at the interrogator-receiver station which is placed at B in FIG. 2a are erroneous.

In order to take into account possible drift of the proportionality factor $k$ which may take a value $k' = k_o(1+\epsilon)$, slightly different from $k_o$ the transponder station produces two additional pulses at times $t_1$ and $t_2$ which are separated by that time interval $t_o = t_2 - t_1$ which is necessary for the voltage produced by the generator to vary by a reference potential difference $U_r = U_{S2} - U_{S1}$: $t_o = t_2 - t_1 = kU_r = k(U_{S2} - U_{S1})$ we then have:

$$U_a = (t/t_o)U_r$$

if the time elapsed between the two measurements is so short that coefficient $k$ has not varied.

The corresponding operation at the interrogator-receiver station at B could therefore be carried out by any operator.

In order to carry out the transmission of both groups of pulses $t_1$, $t_2$ and $t_3$, $t_4$, a type of transponder station as illustrated diagrammatically in FIG. 1a is employed.

The low-frequency stages of the transmitting portion of a transponder station as shown in FIG. 1a comprise a ramp generator 4, four threshold devices 6, 8, 10 and 12 which are connected to the output of the generator and followed by a logic and pulse-shaping device 14 which applies a calibrated pulse to the monostable device 16 each time one of the threshold circuits produces a pulse of short duration. When the monostable device is in its unstable state, said device puts a low-frequency oscillator 18 into communication with the modulating stage of a transmitter-receiver 20 which radiates signals by means of an antenna 22.

Figure 1B:
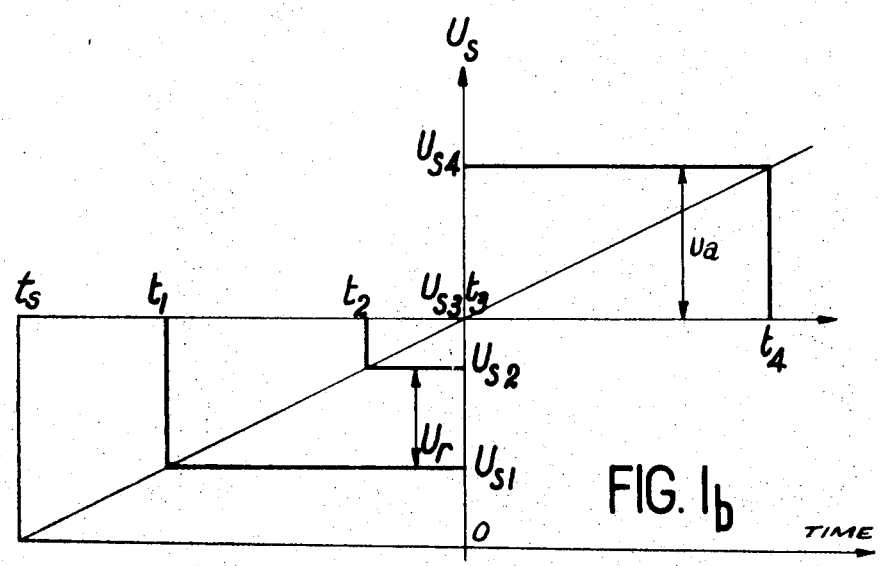
FIG. 1b represents the variations in the voltage $U_s$ produced by the integrating amplifier of the transmitter of a transponder station as a function of the time $t$.

FIG. 1b represents the variations of the voltage $U_s$ which is produced by the generator 4 as a function of the time $t$ from time $t_s$ when power supply is applied. The threshold circuits 5 produce pulses of short duration when the output voltage acquires given values $U_{S1}$, $U_{S2}$, $U_{S3}$ and $U_{S4}$ which are so defined that the difference between the two first values $U_{S2}-U_{S1}$ should be equal to the reference voltage $U_r$ while the difference between the last two values $U_{S4}-U_{S3}$ is equal to the measurement voltage $U_a$ which it is desired to transmit circuits 6 and 8 may be adjusted once and for all by providing the reference "window" $U_r$. One of the threshold circuits $U_{S3}$ and $U_{S4}$ may also be adjusted once and for all (10, for instance) while the other circuit (12, for instance) is controlled by the value to be transmitted.

Figure 2B:
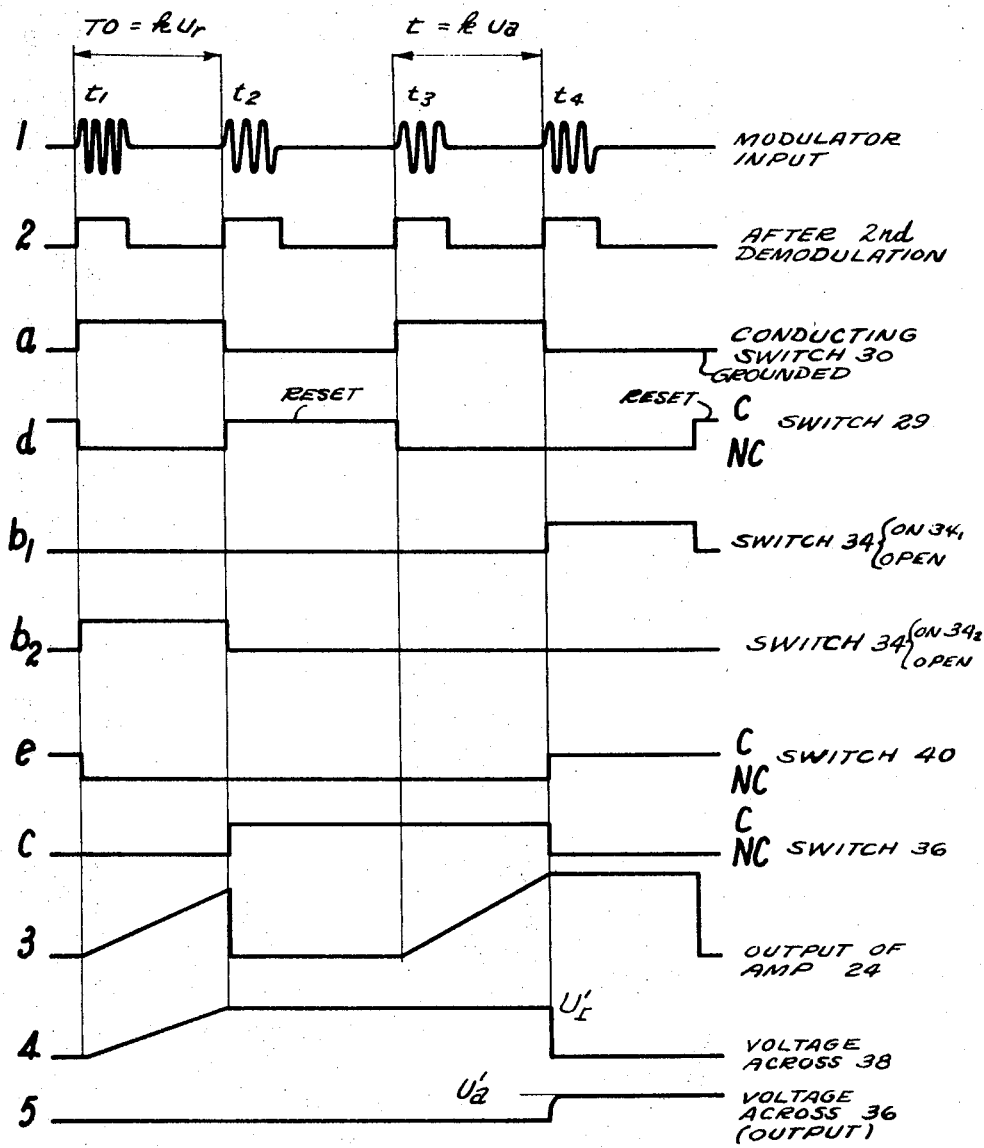
FIG. 2b represents the electric voltages which appear at different points of the circuit of FIG. 2.

It will be noted that line 1 of FIG. 2b represents the low-frequency voltage which is applied to the high-frequency modulator of the transponder station.

The pulses emitted by the device 20 are received and then demodulated at the interrogator-receiver station. It should be noted that said line 1 of FIG. 2b also represents the output voltage of the high-frequency demodulator of an interrogator-receiver station. Said pulses serve to reconstruct the reference voltage and the measured voltage, these operations being carried out in the integrating and correcting stage of the station which is shown in FIG. 2a.

The four-pulse train which is received at the interrogator-receiver station defines two time intervals $t_o=t_2-t_1$ and $t=t_4-t_3$, wherein $t_o$ relates to the reference voltage which is located at the transponder station, $t$ relates to the analog voltage derived from the transducer which is located at this station. Since said time intervals $t_o$ and $t$ are defined by pulses which are induced by the same integrator, the integration factor which relates to these two time intervals is identical on condition that the output voltage of the integrator is strictly linear.

The value $U_a$ can then be calculated in two different ways as has already been explained:

a. by carrying out the operation $U_a=(t/t_o)U_r$ by analog or digital computation. However, these operations are costly on account of the degree of accuracy which is required.

b. by integrating a linear voltage during the time interval $t_o$ so as to transform this latter into a direct current voltage which is compared with a reference voltage produced at the interrogator-receiver station. The difference between these two voltages will serve to correct the analog voltage which is obtained by integration of the same linear voltage during the time interval $t$ so as to obtain the voltage $U_a$.

As shown in FIG. 2a, there can be seen in the interrogator station a first amplifier 24 shunted by the parallel assembly of an integrating capacitor 26 having a capacitance C and an automatic break switch 29. The input terminal of the integrating amplifier 24, 26 is connected to a source 28 (not shown) of locally produced direct current voltage by means of an automatic changeover switch 30 and a resistor 32 having a value R. Depending on the position of the automatic changeover switch 30, the end of the resistor 32 is connected to the direct current voltage source 28 or to ground. The integrated voltage which appears at the output of the amplifier 24 is switched by means of a two-position automatic changeover switch 34; said voltage is stored either by means of a memory capacitor 36 (contact $34_1$) or by means of a second memory capacitor 38 (contact $34_2$). The second electrode of these two capacitors is connected to ground. It will be noted that an automatic break switch 40 is connected in parallel with the capacitor 38.

The electrode of the capacitor 38 which is connected to the automatic changeover switch 34 is coupled to the first input of a differential amplifier 41, a voltage produced by a DC standard reference voltage source 42 being applied to the second input of said amplifier and the second pole of said source being connected to ground. The output voltage of the differential amplifier is applied via a reversing amplifier 43, via the automatic break switch 46 and via the resistor 44 having a value R' to the input of the first amplifier 24. The assembly consisting of amplifier 43, beak switch 46 and resistor 44 constitutes a feedback channel.

The automatic break switches 29, 40 and 46 as well as the automatic changeover switches 30 and 43 are controlled by a logic device 48 which receives the pulses emitted by the transponder stations after demodulation.

During a first time interval which is defined by the instants $t_1$ and $t_2$, the automatic changeover switch 30 is conductive, the switch 34 is on $34_2$ and the voltage derived from the integrator network 32, 24, 26 is directed to the capacitor 38 which stores the maximum value reached at the output of 24 (switch 40 being open).

The differential amplifier 41 compares the integrated voltage which is stored in the capacitor 38 with the standard reference voltage Ve produced by the source 42.

After the reference voltage has been stored by 38, switch 34 opens at time $t_2$. The reset switch 29 temporarily closes. At time $t_3$, (i.e., after the comparison the automatic break switch 46 becomes also conductive at time $t_3$ and the integrating network (amplifier 24, capacitor 26, and resistor 32 and 44) produces a second linear sweep during the second time interval between the instants $_3$ and $t_4$. At the end of the integration (i.e. at time $t_4$) the switch 34 connects to the output to $34_1$, whereby the maximum voltage attained at the integrator output, after the integration time $t_4-t_3$, is stored by capacitor 36.

It should be noted that, during the second integration, the integrator takes into account the voltage stored as a result of the comparison effected by the amplifier 41.

Whereas we have $t_o=kU_o$, $t=kU_a$ at the transmission end (transmitter-receiver station), we have $t_o=k'U'_o$ at the receiving end (interrogator-receiver station) during the initial part of the operation of the integrator-comparator of FIG. 2a.

For the time interval $t_o$, the switch is conductive and the output of the integrator finally delivers the voltage $U'_r$ to the storage capacitor 38: $U'_r=t_o/k'=U_rk/k'$. This voltage is compared with a standard reference voltage $U_e$ produced by the DC source 42, If G is the gain of the differential amplifier 41 which performs the function of comparator for the voltages $U'_r$ and $U_e$, the output voltage $U_s$ of the amplifier is given by the formula:

$$U_s=G[U_e-U'_r]=G\left[U_e-U_r\frac{k}{k'}\right]$$

if $U_e=U_r$, we have:

$$U_s=GU_r\left[1-\frac{k}{k'}\right]$$

Under these conditions, the voltage $U'_a$ which is produced by the device of FIG. 2a is:

$$U'_a=U_ak\left[\frac{1}{k'}+\frac{GUe}{CR'}\left(1-\frac{k}{k'}\right)\right]$$

It will be recalled that C and R' are respectively the capacitance of the capacitor 26 and the value of the resistor 44.

If the temperature has not varied at the transponder station, we will have $k=k_o$ and, on condition that:

$$k_o\left[\frac{1}{k'}+\frac{GUe}{CR'}\left(1-\frac{k_o}{k'}\right)\right]=1 \quad\quad (a)$$

(that is if $$G=\frac{C'R'}{U_ek_o})$$

we obtain: $U'_a=U_a$

If the temperature varies at said transponder station, $k=k_o(1+\epsilon)$ and, on condition that equation (a) is satisfied:

$$U'_a=U_ak\left[\frac{1}{k'}+\frac{1}{k_o}\left(1-\frac{k}{k'}\right)\right]$$

with the result that, if $k$ Is replaced by its value, $$U'_a = U_a k_o (1+\epsilon) \left[ \frac{1}{k'} + \frac{1}{k_o} \left( \frac{1-k_o(1+\epsilon)}{k'} \right) \right]$$

and a simple calculation shows that:

$$U'_a = U_a \left[ 1 + \epsilon \left( 1 - \frac{k_o}{k} \right) - \frac{k_o}{k'} \epsilon^2 \right]$$

if $k_o = k'$ $$U'_a = U_a [1 - \epsilon^2]$$

Thus, in the case of an error $\epsilon$ at the transponder station which arises from drifts in time and in temperature, the analog voltage $U_a$ is obtained with an error $\beta^2$.

This method is not perfect as in the case of the division of the two time intervals $t_o$ and $t$ but makes it possible at lower cost to make a correction which is in relation to the requisite degree of accuracy.

The diagram of FIG. 2b represents the operation of the automatic break switches and changeover switches as well as the voltages produced in the integrators and the operation of the device itself.

Line 1 represents the modulated pulses as applied to the modulator of the transponder station and as said pulses appear at the output of the demodulator of the interrogator-receiver station.

Line 2 shows the pulses after a second demodulation and shaping operation.

LInes $a$, $d$, $b_2$, $b_1$, $e$ and $c$ represent as a function of time the states of conduction (c) or of nonconduction (nc) of the switches 30, 29, of the contacts $34_2$ and $34_1$ of the changeover switch 34, of the break switches 40, 46 respectively.

LIne 3 represents the output voltage of the integrator 24–26.

LIne 4 represents the voltage which is stored by the capacitor 38.

Line 5 represents the voltage which is stored by the memory capacitor 36.

It is apparent from a study of the diagrams of FIG. 2b that the integrator operates in three steps:

a. integration between the time intervals $t_1$ and $t_2$,
b. comparison of the first voltage obtained by integration with a reference voltage.
c. a further operation which consists of integration between the time intervals $t_3$ and $t_4$ and which is corrected according to the results of the comparison.

Figure 3:
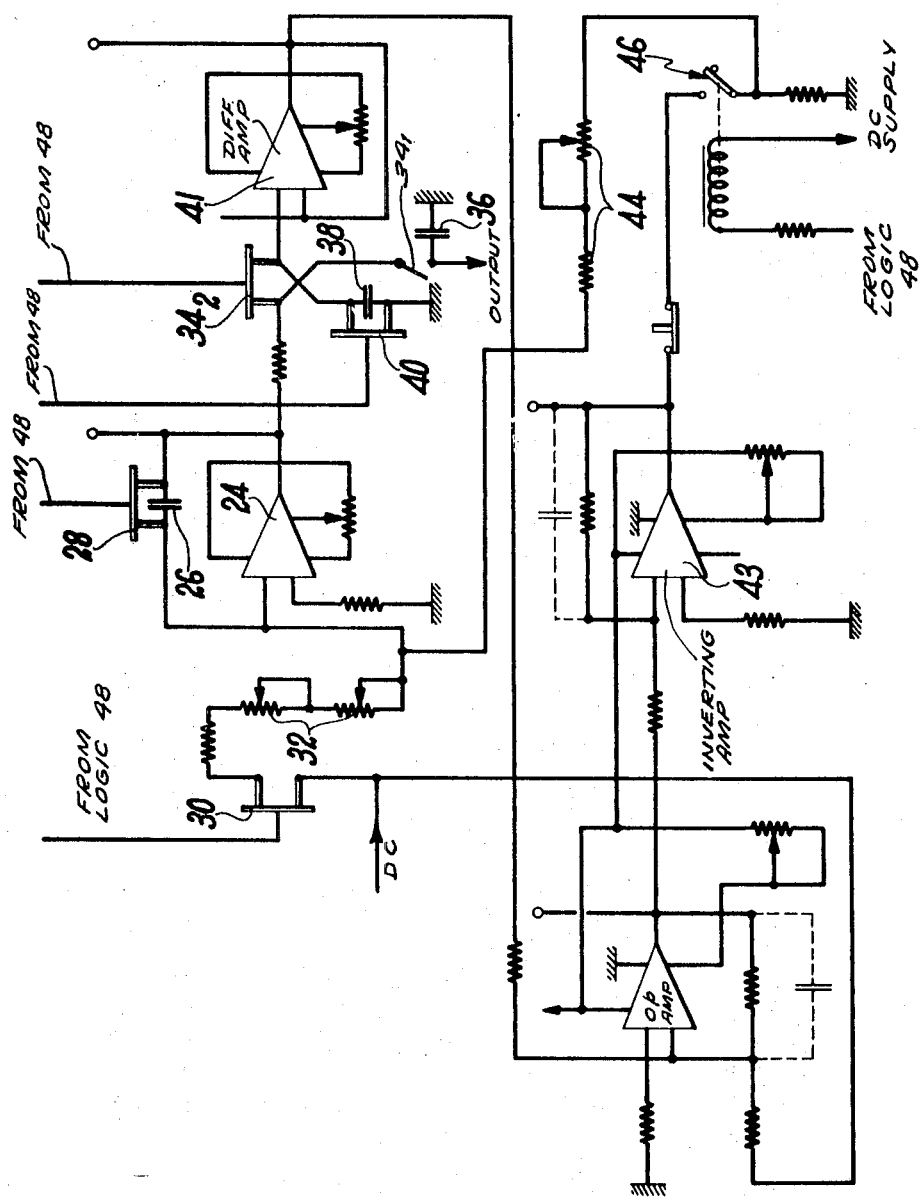
FIG. 3 is an electrical construction diagram of the device of FIG. 2.

FIG. 3 represents a circuit diagram of the construction of the correcting integrator of FIG. 2.

All the elements of this apparatus can be identified by means of a study of this diagram.

However, it will be noted that the break switches or changeover switches are field-effect transistors, except for the switch 46 which is constituted by the make contact of an electromagnetic relay. MOreover, the device for controlling the break switches and changeover switches is not mounted in the same frame as the correcting integrator of FIG. 3.

Figure 4:
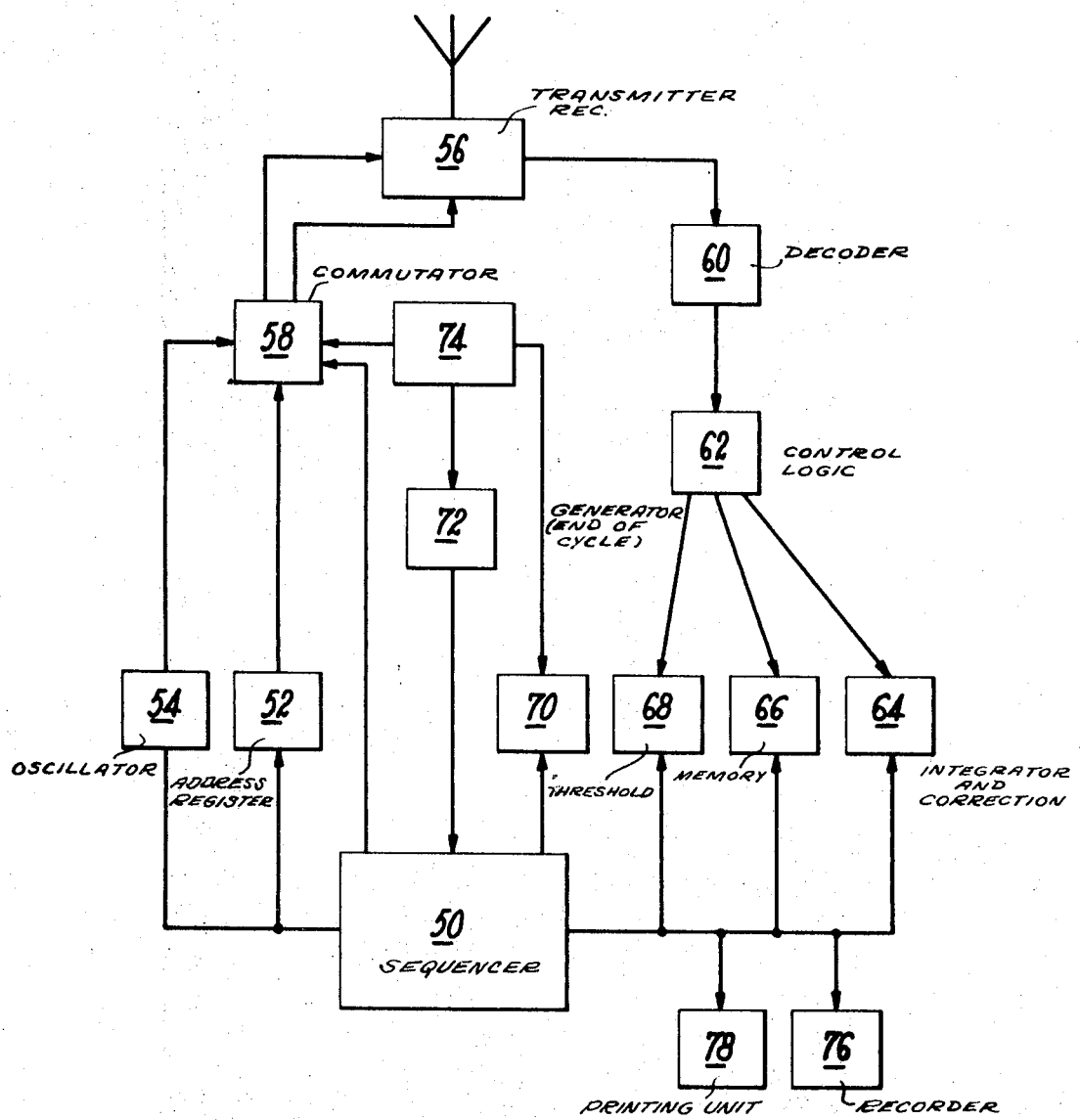
FIG. 4 is a block diagram representing the fixed interrogator-receiver station.

FIG. 4 is a block diagram of the fixed interrogator-receiver station.

The successive selection of the moving transponder stations is carried out by means of a programmer 50 in accordance with a preestablished scheme. Said programmer interrogates an address register 52. These two units 50 and 52 control the operation of the transmitter which forms part of the transmitter-receiver 56 by means of a switching device 58. Said programmer also actuates an oscillator 54 which provides low-frequency modulation of the pulses which are transmitted and designate a moving station.

During the reception period, the pulses which are emitted by each moving station and then demodulated at low frequency are transmitted by the receiver of the transmitter-receiver 56 to the decoder 60, then switched by a logic device 62 towards the integrating and correcting state 64 which has already been described. It should be noted that the logic device 62 also controls a memory system 66 and a threshold device 68 to which further reference will be made hereinafter.

As has already been seen, the integrating and correcting stage 64 measures the time intervals which elapse between the pulses of the first pair $t_1$ $t_2$ and the second pair $t_3$ $t_4$. The measured voltage which is transmitted by the second group of pulses of each sequence is registered in the quantitative memory system 66.

The threshold device 68 serves to check a certain number of measured quantities in each moving station. When the signals which are transmitted by the moving stations exhibit anomalies, a device for identifying faults in the interrogated station 70 initiates either one or a number of further interrogations of the moving station in question with or without increase in power. At the end of a cycle, the generator 72 produces a so-called "end of cycle" pulse which initiates the following operation by means of the programmer.

Said generator is controlled by the general switching device 74. A recorder 76 is associated with the station as well as a printing unit 78 so that all variations of a given measured quantity can be followed with accuracy.

The equipment which has just been described can be employed for transmitting a large number of measurements; it has already served to take measurements of radioactivity at several points of a large plant and has also been employed for taking accurate temperature measurements.

A system of this type can also serve to transmit a number of measurements at the same time without modifying the data transmission bandwidth.

If provision is made in a given moving state for a number of transducers and integration systems and the emitted pulses are modulated at different frequencies, there is nothing to prevent simultaneous transmission of several measurements. At the interrogator-receiver station, filters are employed to separate the differently modulated pulses and the integration and correction operations can be carried out simultaneously in the case of these different measurements. A number of measurements can also be transmitted one after the other. The transmission bandwidth is then reduced but a single correcting system can process all these data at the receiving end.

The method of measurement which is carried out by means of the equipment according to the invention is independent of the actual transmission system which is not necessarily a radiotelemetry system but can be a wired system of the telephone type, for example.

The present applicant has constructed an equipment unit of the type which has been partially described in the foregoing. The overall precision can attain $5\times10^{14}$ when the temperature is within the range of $-20°$ C. to $50°$ C. in respect of integration times which do not exceed 1 second.

What is claimed is:

1. A telemetering system having at least one interrogator-receiver station and at least one transponder station, comprising at said transponder station a generator for producing a linearly rising voltage, means for forming $2n$ pulses which define in pairs $n$ time intervals representing respectively a reference quantity and $n-1$ measured quantities, and further comprising at the interrogator-receiver station a direct current voltage linear integrator which operates during said $n$ time intervals, a voltage comparator which measures the difference between the voltage corresponding to the reference quantity and a local standard reference voltage at the end of the fist time interval, said integrator being controlled by the comparator during the others of said intervals for correction of the integrations during said other $n-1$ time intervals.

2. A telemetering system as claimed in claim 1, wherein the pulses emitted by the transponder station or stations are modulated by different frequencies.

3. A telemetering system as claimed in claim 1, wherein each moving transponder station comprises an integrating amplifier, four threshold circuits coupled to said integrator, a logic and shaping device which receives the voltages produced by the threshold circuits, a monostable multivibrator driven by the logic device and a low-frequency oscillator whose coupling with the modulating stage of the transponder station is controlled by the monostable multivibrator.

4. A telemetering system as claimed in claim 3, wherein the interrogator-receiver station comprises an alternating-current amplifier, a direct current voltage source, an automatic changeover switch, the amplifier being connected to the source through the changeover switch, an integrating capacitor and a first automatic break switch which are associated in parallel with the amplifier, an automatic two-position changeover switch, a first memory capacitor connected to said second changeover switch, a second memory capacitor connected to a second position of the changeover switch, a second break switch connected in shunt across the second memory capacitor, a differential amplifier, an auxiliary reference voltage source, the differential amplifier being adapted to compare the voltage which is stored in the second memory capacitor with said auxiliary reference voltage, an amplifier, a third break switch as well as a resistor constituting a feedback channel for coupling said differential amplifier to the input of the alternating-current amplifier, the two changeover switches and the three break switches being actuated by he pulses emitted by the transponder station with which a communication is established.